United States Patent
Kim et al.

(10) Patent No.: US 7,969,960 B2
(45) Date of Patent: Jun. 28, 2011

(54) METHOD FOR IP MANAGEMENT CONNECTION CONTROL IN WIRELESS COMMUNICATION SYSTEM

(75) Inventors: Jeong-Ha Kim, Daejeon (KR); Kyung-Soo Kim, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 860 days.

(21) Appl. No.: 11/944,527

(22) Filed: Nov. 23, 2007

(65) Prior Publication Data
US 2008/0130537 A1 Jun. 5, 2008

(30) Foreign Application Priority Data

Dec. 1, 2006 (KR) .................. 10-2006-0120816
Sep. 21, 2007 (KR) .................. 10-2007-0096615

(51) Int. Cl.
*H04J 3/24* (2006.01)
(52) U.S. Cl. .................. 370/349; 370/313; 370/389
(58) Field of Classification Search .................. 370/389, 370/395.54, 254, 310.2–349, 395.2, 395.21, 370/395.3–395.32
See application file for complete search history.

(56) References Cited

U.S. PATENT DOCUMENTS

| | | | |
|---|---|---|---|
| 2002/0019880 A1* | 2/2002 | Sakakura ................. | 709/245 |
| 2003/0045271 A1* | 3/2003 | Carey et al. .............. | 455/411 |
| 2005/0125575 A1* | 6/2005 | Alappat et al. ........... | 710/41 |
| 2005/0265360 A1* | 12/2005 | Kim et al. ............... | 370/400 |
| 2007/0026887 A1* | 2/2007 | Voyer et al. ............. | 455/525 |
| 2007/0058544 A1 | 3/2007 | Kim et al. | |
| 2008/0037478 A1 | 2/2008 | Na et al. | |

FOREIGN PATENT DOCUMENTS

| | | |
|---|---|---|
| KR | 1020030027490 A | 4/2003 |
| KR | 1020030035801 A | 5/2003 |
| KR | 10-2005-0078631 A | 8/2005 |
| KR | 10-2006-0082039 A | 7/2006 |
| KR | 10-2007-0011170 A | 1/2007 |
| KR | 10-2008-0020715 A | 3/2008 |

\* cited by examiner

*Primary Examiner* — Kwang B Yao
*Assistant Examiner* — Kenan Cehic
(74) *Attorney, Agent, or Firm* — Jefferson IP Law, LLP (57) ABSTRACT

The present invention relates to an Internet protocol (IP) management connection control method in a mobile communication system. In the method, a first traffic connection between an access point and a packet access router is established, uplink and downlink second traffic connections between the access point and an access terminal are established, and an IP management message is transmitted through the first traffic connection and the second traffic connection.

20 Claims, 7 Drawing Sheets

METHOD FOR IP MANAGEMENT CONNECTION CONTROL IN WIRELESS COMMUNICATION SYSTEM

CROSS-REFERENCE TO RELATED APPLICATION

This application claims priority to and the benefit of Korean Patent Application No. 10-2006-0120816 filed in the Korean Intellectual Property Office on Dec. 1, 2006, and No. 10-2007-0096615 filed in the Korean Intellectual Property Office on Sep. 21, 2007, the entire contents of which are incorporated herein by reference.

BACKGROUND OF THE INVENTION (a) Field of the Invention

The present invention relates to a connection control method for managing Internet protocol in a communication system.

(b) Description of the Related Art

A high-speed portable Internet (HPi) system is a $3.5^{th}$ generation mobile communication system in which a wireless transmission method for guaranteeing spectrum usage efficiency in the 2.3 GHz frequency bandwidth is used to provide images of various Internet protocol (IP)-based wireless data services (e.g., streaming video, file transfer protocol (FTP), email, and chatting services) and perform high-speed packet data transmission.

It is required to allocate an IP address to an authenticated access terminal to connect to the Internet through a mobile communication system, and the access terminal connects to the Internet by using the allocated IP address to receive various services.

Methods for allocating the IP address to the access terminal include a static IP address allocation method and a dynamic IP address allocation method.

In the static IP address allocation method, the IP address allocated to the access terminal is used, and an IP managing message for allocating the IP address is not used. Accordingly, a connection establishment process for transmitting the IP managing message is not required. However, in this static IP address allocation method, when the access terminal leaves a coverage area of a subnet that allocated the IP address to the access terminal, IP address reallocation between subnets is not supported. Accordingly, the static IP address allocation method has mobility limitation in the mobile communication system in which the access terminal moves from a cell to another cell.

In the dynamic IP address allocation method, when the access terminal moves from a cell to another cell, a roaming or handover operation is performed to guarantee inter-cell mobility. That is, when the access terminal leaves a coverage area of a corresponding subnet, an IP address is reestablished based on a dynamic host configuration protocol to provide a roaming service to the access terminal, or a handover operation by mobile IP registration using care-of-address (CoA) is performed to continuously provide a mobile communication service.

However, in this wireless communication system, a secondary management connection is established to allocate an IP address to an access terminal connected to the system, traffic may not be transferred but the IP managing message may be transmitted through this secondary management connection, and additional connection is required to be established for traffic data transmission. Accordingly, access point (AP) resources including transport connection ID and service flow may be wasted.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an Internet protocol (IP) management connection controlling method and device for efficiently using resources of an access point.

According to an exemplary embodiment of the present invention, in an IP management connection controlling method in an access point of a mobile communication system, a first traffic connection is established to a packet access router, uplink and downlink second traffic connections are established to an access terminal, and an IP management message is transmitted through the first traffic connection and the second traffic connection.

According to another exemplary embodiment of the present invention, in an IP management connection control method of an access point of a mobile communication system, initial ranging of an access terminal is established, basic transport capability of the access terminal is established, the access terminal is authenticated, an authentication key is exchanged, the access terminal is registered, an uplink traffic connection and a downlink traffic connection to the access terminal are established, an IP management message is transmitted through the uplink traffic connection and the downlink traffic connection, and an IP address is allocated.

As described, according to the exemplary embodiments of the present invention, an auxiliary management connection is not used for transmission of an IP management message from an access point to an access terminal, a transport connection for transmitting an IP management message packet and a traffic packet is established, and therefore resources of the access point may be efficiently used without establishing an additional connection.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" and "comprising", will be understood to imply the inclusion of stated elements but not the exclusion of any other elements. The terms "unit", "module", and "block" used herein mean one unit that processes a specific function or operation, and may be implemented by hardware, software, or a combination thereof.

An Internet protocol (IP) management connection controlling method according to an exemplary embodiment of the present invention will now be described.

Figure 1:
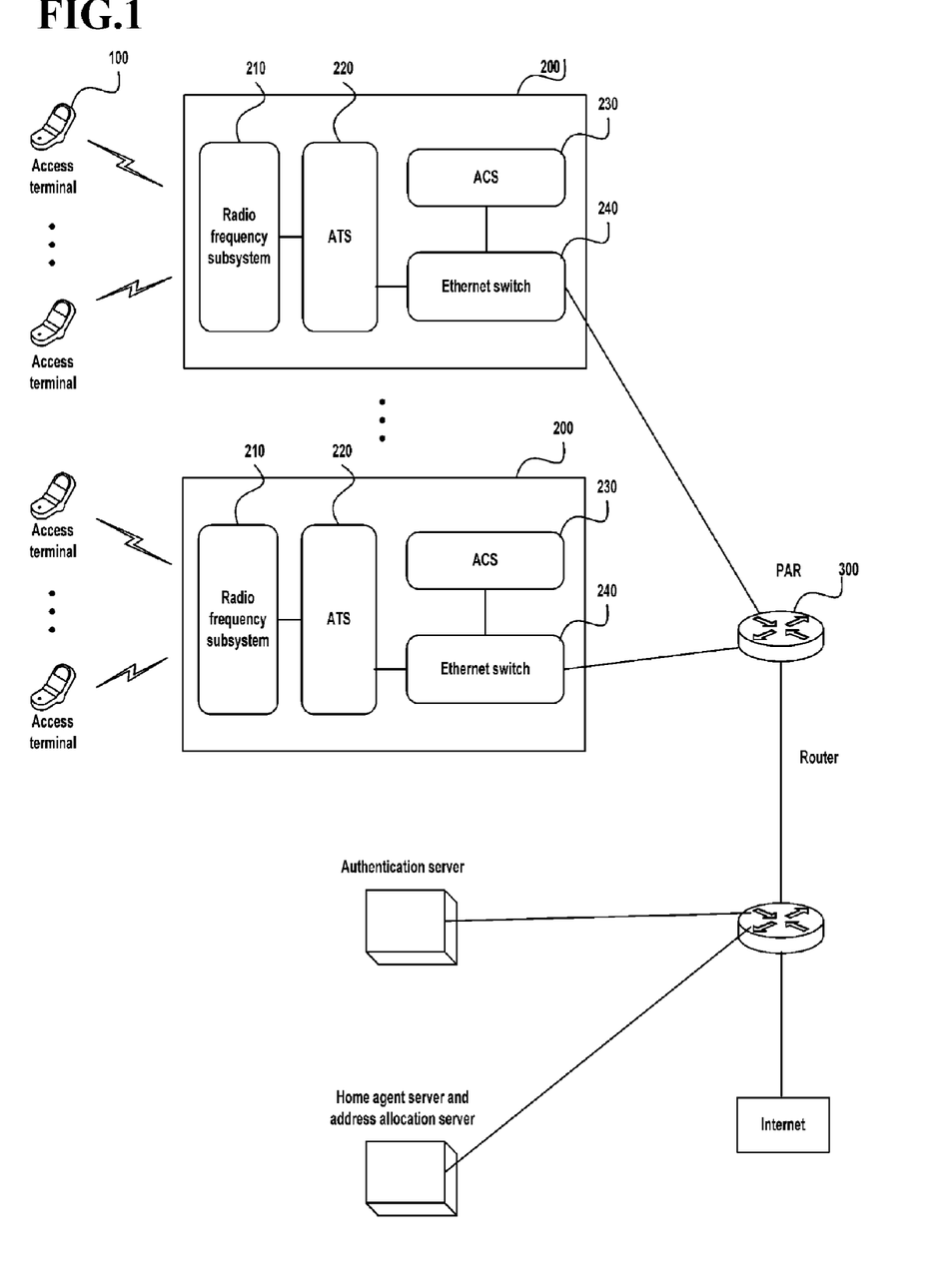
FIG. 1 is a schematic diagram of a mobile communication system according to an exemplary embodiment of the present invention.

FIG. 1 is a schematic diagram of a mobile communication system according to the exemplary embodiment of the present invention.

As shown in FIG. 1, the mobile communication system according to the exemplary embodiment of the present invention includes an access terminal (AT) 100, an access point (AP) 200, and a packet access router (PAR) 300.

The access point 200 is connected to the access terminal 100 to support wireless access and network connection of the access terminal 100.

The access point 200 includes a radio frequency subsystem 210, an access traffic subsystem (ATS) 220, an access controlling subsystem (ACS) 230, and an ethernet switch 240.

The radio frequency subsystem 210 wirelessly transmits and receives data.

The access traffic subsystem 220 performs traffic processes, a packet scheduling operation, a wireless link controlling operation, a radio resource managing operation, a packet matching operation between wired and wireless links, and a hybrid automatic repeat request (HARQ) controlling operation. The access traffic subsystem 220 along with the access controlling subsystem 230 and radio frequency subsystem 210 performs traffic processes and wireless link transmitting/receiving control operations.

The access traffic subsystem 220 receives cell information and user connection information from the access controlling subsystem 230, performs traffic processes and a scheduling function, and transmits a scheduled downlink data combination to a radio frequency device to request radio link transmission, or processes a received uplink data combination to transmit it to the PAR 300.

The access controlling subsystem 230 controls a protocol operation for controlling the access point 200 and the access terminal 100, and manages users and cells.

The PAR 300 connected to the access point 200 based on IP controls mobility of the access terminal 100 connected to the access point 200, performs a packet routing function, and is connected to the Internet to access an IP-based wired core network. In addition, the PAR 300 is connected to an authentication server, a home agent (HA), and an address allocation server to perform an authentication function, a dynamic host configuration protocol (DHCP) function, a mobile IP (MIP) function, a handover function between access points, and a handover control function between the PARs 300.

The IP management connection controlling method according to the exemplary embodiment of the present invention will now be described with reference to FIG. 2 and FIG. 3.

Figure 2:
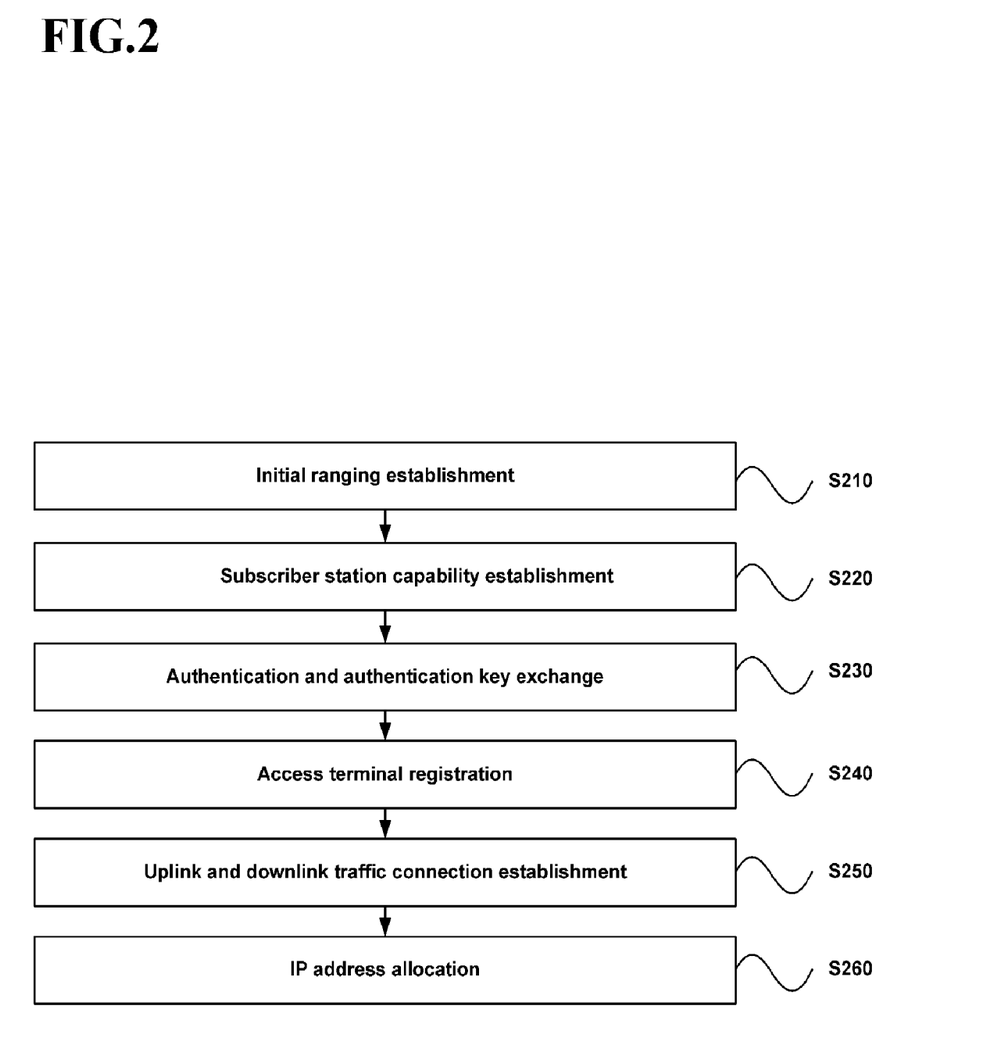
FIG. 2 is a flowchart representing an IP management connection controlling method according to the exemplary embodiment of the present invention.
Figure 3:
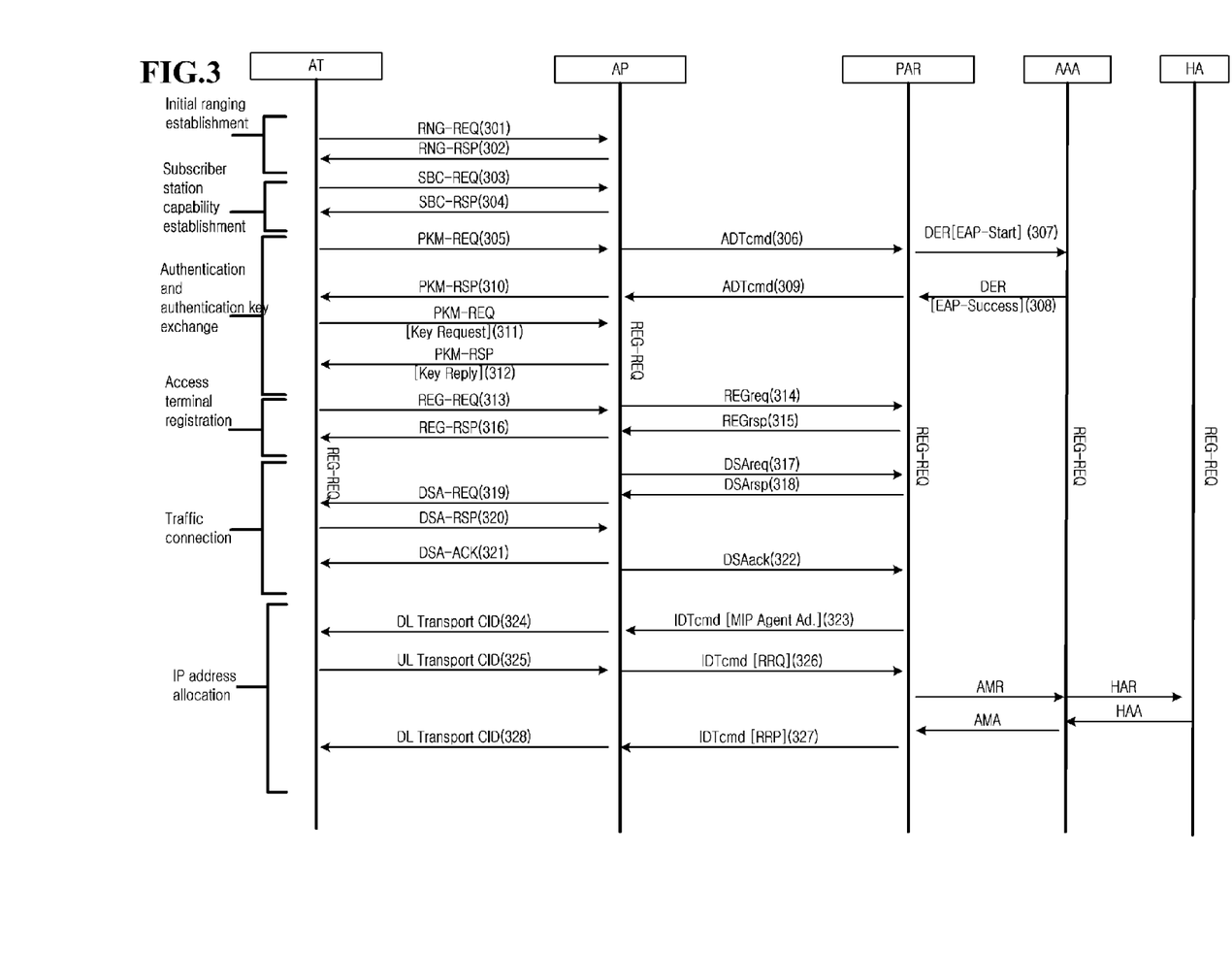
FIG. 3 is a diagram representing a flow of messages of the IP management connection controlling method according to the exemplary embodiment of the present invention.

FIG. 2 is a flowchart representing the IP management connection controlling method according to the exemplary embodiment of the present invention, and FIG. 3 is a diagram representing a flow of messages of the IP management connection controlling method according to the exemplary embodiment of the present invention.

Firstly, the access point 200 establishes initial ranging in step S210. As shown in FIG. 3, when receiving a ranging request (hereinafter referred to as "RNG-REQ") message 301 from the access terminal 100 desiring to receive an IP address, the access point 200 establishes the initial ranging between the access terminal 100 and the access point 200 and transmits a ranging response (hereinafter referred to as "RNG-RSP") message 302 to the access terminal 100.

The access point 200 establishes subscriber station basic capability in step S220. As shown in FIG. 3, when receiving a subscriber station basic capability request (hereinafter referred to as "SBC-REQ") message 303 from the access terminal 100, the access point 200 establishes the subscriber station basic capability and transmits a subscriber station basic capability response (hereinafter referred to as "SBC-RSP") message 304 to the access terminal 100.

The access point 200 performs access terminal authentication and authentication key exchange in step S230. As shown in FIG. 3, when receiving a privacy key management request (hereinafter referred to as "PKM-REQ") message 305 from the access terminal 100, the access point 200 transmits an authorization direct transfer command (hereinafter referred to as "ADTcmd") message 306 to the PAR 300, the PAR 300 transmits a diameter extensible authentication protocol (EAP) request [EAP-Start] (hereinafter referred to as "DER [EAP-Start]") message 307 to an authentication server, and the authentication server performs user authentication and transmits a diameter EAP request [EAP-Success] (hereinafter referred to as "DER[EAP-Success]") message 308 to the PAR 300. The PAR 300 transmits the ADTcmd message 309 to the access point 200, and the access point 200 transmits a privacy key management response (hereinafter referred to as "PKM-RSP") message 310 to the access terminal 100.

When the access terminal 100 receives the PKM-RSP message and transmits an authentication key request PKM-REQ [Key Request] message 311 to the access point 200, the access point 200 allocates an authentication key response PKM-RSP[Key Reply] message 312 to the access terminal 100 to allocate an authentication key.

Subsequently, the access point 200 resisters an access terminal in step S240. As shown in FIG. 3, when receiving a registration request (hereinafter referred to as "REG-REQ") message 313 from the access terminal 100, the access point 200 transmits a registration request (hereinafter referred to as "REGreq") message 314 to the PAR 300. When the PAR 300 registers a user and transmits a registration response (hereinafter referred to as "REQrsp") message 315 to the access point 200, the access point 200 transmits a registration response (hereinafter referred to as "REQ-RES") message 316 to the access terminal 100.

When registering the access terminal, the access point 200 establishes uplink and downlink traffic connections in step S250. The access point 200 firstly establishes traffic connection to the PAR 300, and establishes the uplink and downlink traffic connections to the access terminal 100.

As shown in FIG. 3, when transmitting a dynamic service addition request (hereinafter referred to as "DSAreq") message 317 to the PAR 300 and receiving a dynamic service addition response (hereinafter referred to as "DSAres") message 318 from the PAR 300, the access point 200 transmits a dynamic service addition request (hereinafter referred to as "DSA-REQ") message 319 to the access terminal 100. When receiving a dynamic service addition response (hereinafter referred to as "DSA-RSP") message 320 from the access terminal 100, the access point 200 transmits a dynamic service addition acknowledgement (hereinafter referred to as "DSA-ACK") message 321 to the access terminal 100, and transmits a dynamic service addition acknowledgement (hereinafter referred to as "DSAack") message 322 to the PAR 300.

Subsequently, the access point 200 allocates an IP address to the access terminal 100 in step S260. As shown in FIG. 3, the access point 200 transmits the DSAack message to the PAR 300, and operates in an IP address allocation waiting mode. When the access point 200 in the IP address allocation waiting mode receives an IP direct transfer command (hereinafter IDTcmd") message 323 from the PAR, the access point 200 unpacks the IDTcmd message to identify IP allocation, and transmits a downlink transport connection identifier (hereinafter referred to as "DL Transport CID") message 324 to the access terminal 100.

When the access point 200 in the IP address allocation waiting mode receives an uplink transport connection identifier (hereinafter referred to as "DL transport CID") message 325 from the access terminal 100, the access point 200 transmits an IDTcmd[RRQ(Registration Request)] message 326 to the PAR 300, receives an IDTcmd[RRP(Registration Reply)] message 327 from the PAR 300, and transmits the DL Transport CID message 328 to the access terminal 100.

Figure 4:
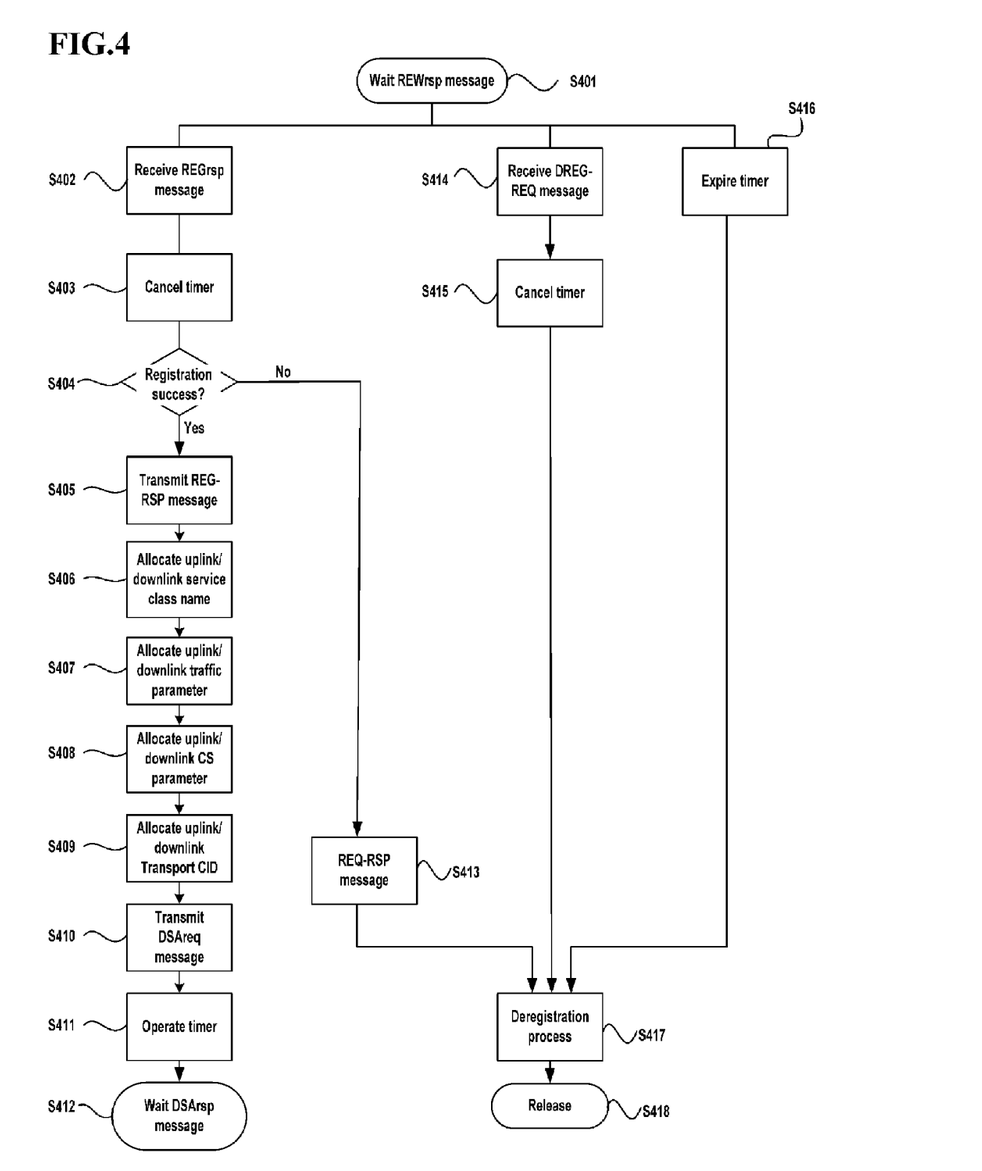
FIG. 4 is a flowchart representing an initial process of the IP management connection controlling method according to the exemplary embodiment of the present invention.

An initial process of the IP management connection controlling according to the exemplary embodiment of the present invention will now be described with reference to FIG. 4. FIG. 4 is a flowchart representing the initial process of the IP management connection controlling according to the exemplary embodiment of the present invention.

As shown in FIG. 4, the access point 200 transmits the REGreq message to the PAR 300, and operates in a REGrsp message waiting mode in step S401. When the access point 200 in the REGrsp message waiting mode receives the REGrsp message from the PAR 300 in step S402, the access point 200 cancels an operating response timer in step S403, and checks a response field of the received REGrsp message to identify a registration result for the access terminal 100 in step S404.

When failing in the registration for the access terminal 100, the access point 200 transmits the REG-RSP message including a response field indicating a failure of user registration to the access terminal 100 in step S413, and performs a registration cancel process in steps S417 and S418. When succeeding in the registration for the access terminal 100, the access point 200 transmits the REG-RSP informing of success of the user registration to the access terminal 100 in step S405.

The access point 200 allocates a service class name for uplink and downlink IP management connections from system information to start the IP management connection process in step S406, allocates traffic parameters including a maximum traffic transmission speed designated to a service class in step S407, allocates convergence sublayer (CS) parameters including a packet classification principle in step S408, and establishes uplink and downlink transport connection identifiers (hereinafter referred to as "Transport CID") for traffic transmission in step S215.

Here, the system information is stored and managed in predetermined constituent elements of the access point 200, which is well known to a person of ordinary skill in the art, and therefore detailed descriptions thereof will be omitted.

The access point 200 transmits the DSAreq message including allocated information to the PAR 300 in step S410, operates a response timer in step S411, and changes a mode to a DSArsp message waiting mode for awaiting the DSArsp message from the PAR 300 in step S412.

When the access point 200 in the REGrsp message waiting mode in step S401 receives a deregistration request (hereinafter referred to as "DREG-REQ") message from the access terminal 100 in step S414, the access point 200 cancels the operating timer in step S415, and performs a deregistration process in steps S417 and S418.

In addition, when the access point 200 in the REGrsp message waiting mode in step S401 receives a timer finish request in step S416 because of abnormal conditions including no response for the registration request from the PAR 300, the access point 200 performs the deregistration process in steps S417 and S418.

Figure 5:
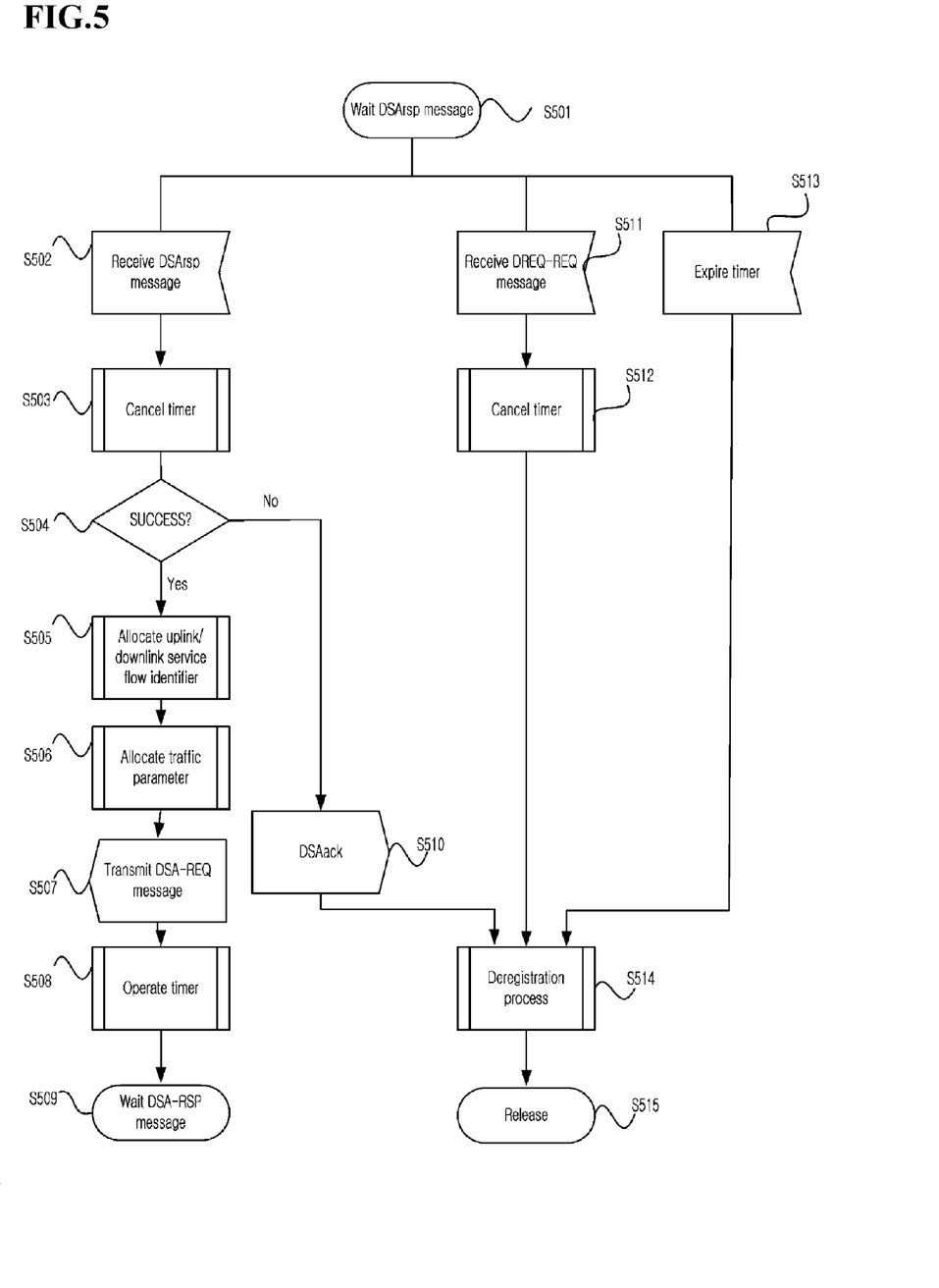
FIG. 5 is a flowchart representing a traffic connection process between an access point and a PAR in the exemplary embodiment of the present invention.

A traffic connection process between the access point and the PAR in the IP connection management controlling method according to the exemplary embodiment of the present invention will now be described with reference to FIG. 5. FIG. 5 is a flowchart representing a traffic connection process between the access point and the PAR in the exemplary embodiment of the present invention.

As shown in FIG. 5, when the access point 200 in the DSArsp message waiting mode in step S501 receives the DSArsp message from the PAR 300 in step S502, the access point 200 cancels the operating timer in step S503, and checks the received message to identify the DSA connection of the PAR 300 in step S504.

When failing the DSA connection to the PAR 300, the access point 200 transmits the DSAack message including an identification code informing of the failure to the PAR 300, and performs a deregistration process in steps S514 and S515.

When succeeding in the DSA connection to the PAR 300, the access point 200 allocates an uplink and downlink service flow identifier received from the PAR 300 in step S505, allocates traffic parameters in step S506, and transmits the DSA-REQ message including service flow information including the uplink and downlink service flow identifier, the downlink and uplink Transport CID, and the traffic parameters to the access terminal 100 in step S507. In addition, the access point 200 operates the response timer in step S508, and changes a mode to a DSA-RSP message waiting mode in step S509.

When the access point 200 in the DSArsp message waiting mode in step S501 receives the DREG-REQ message requesting connection cancellation from the access terminal 100 in step S511, the access point 200 cancels the operating timer for the response message in step S512, and performs the deregistration process in steps S514 and S515.

In addition, when the access point 200 in the DSArsp message waiting mode in step S501 receives a time finish request in step S513 because of abnormal conditions including no response from the PAR 300, the access point 200 performs the deregistration process in steps S514 and S515.

A traffic connection process between the access point and the access terminal in the IP management connection controlling method according to the exemplary embodiment of the present invention will now be described with reference to FIG. 6

Figure 6:
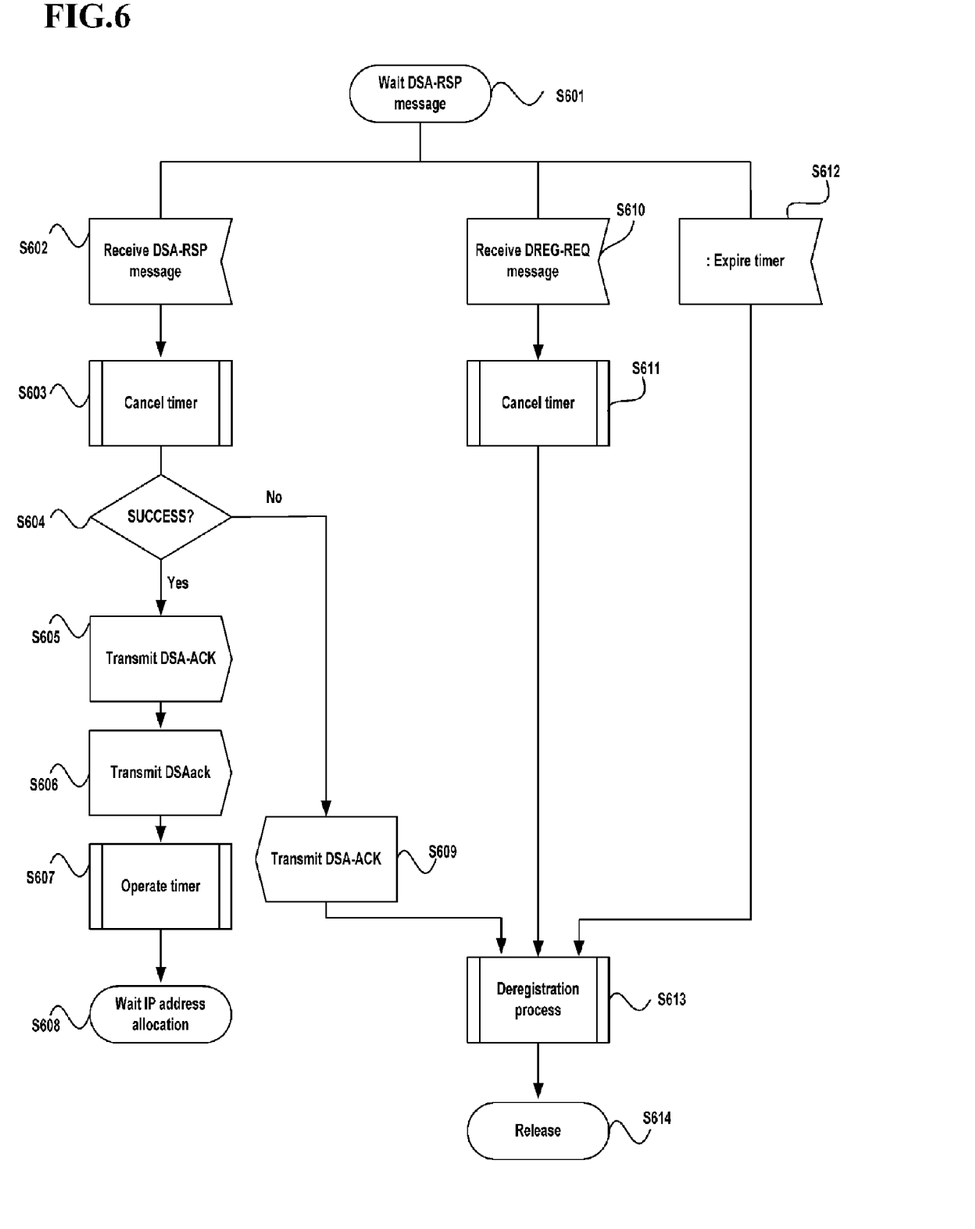
FIG. 6 is a flowchart representing a traffic connection process between the access point and an access terminal in the exemplary embodiment of the present invention.

FIG. 6 is a flowchart representing a traffic connection process between the access point and the access terminal in the exemplary embodiment of the present invention.

As shown in FIG. 6, when the access point 200 in the DSA-RSP message waiting mode in step S601 receives the DSA-RS message in step S602, the access point 200 cancels the operating response timer in step S603, and checks the received message to identify DSA connection of the access terminal 100 in step S604. When failing in the DSA connection of the access terminal 100, the access point 200 transmits the DSA-ACK message including an identification code informing the failure to the access terminal 100 in step S609, and performs the deregistration process in steps S613 and S614.

When succeeding in the DSA connection of the access terminal 100, the access point 200 transmits the DSA-ACK message including an identification code informing of the success to the access terminal 100 in step S605, and transmits the DSAack message including the identification code informing of the success to the PAR 300 in step S607. In addition, the access point 200 operates a timer that is allowed to perform IP address allocation of the access terminal 100 in step S607, and changes a mode to an IP address allocation waiting mode in step S608.

When the access point 200 in the DSA-RSP message waiting mode in step S601 receives the DREG-REQ message for requesting connection cancellation from the access terminal 100 in step S610, the access point 200 cancels the operating response timer in step S611, and performs the deregistration process in steps S613 and S614.

When the access point 200 in the DSA-RSP message waiting mode in step S601 receives a timer finish request in step S612 because of abnormal conditions including no response from the access terminal 100, the access point 200 performs the deregistration process in steps S613 and S614.

Figure 7:
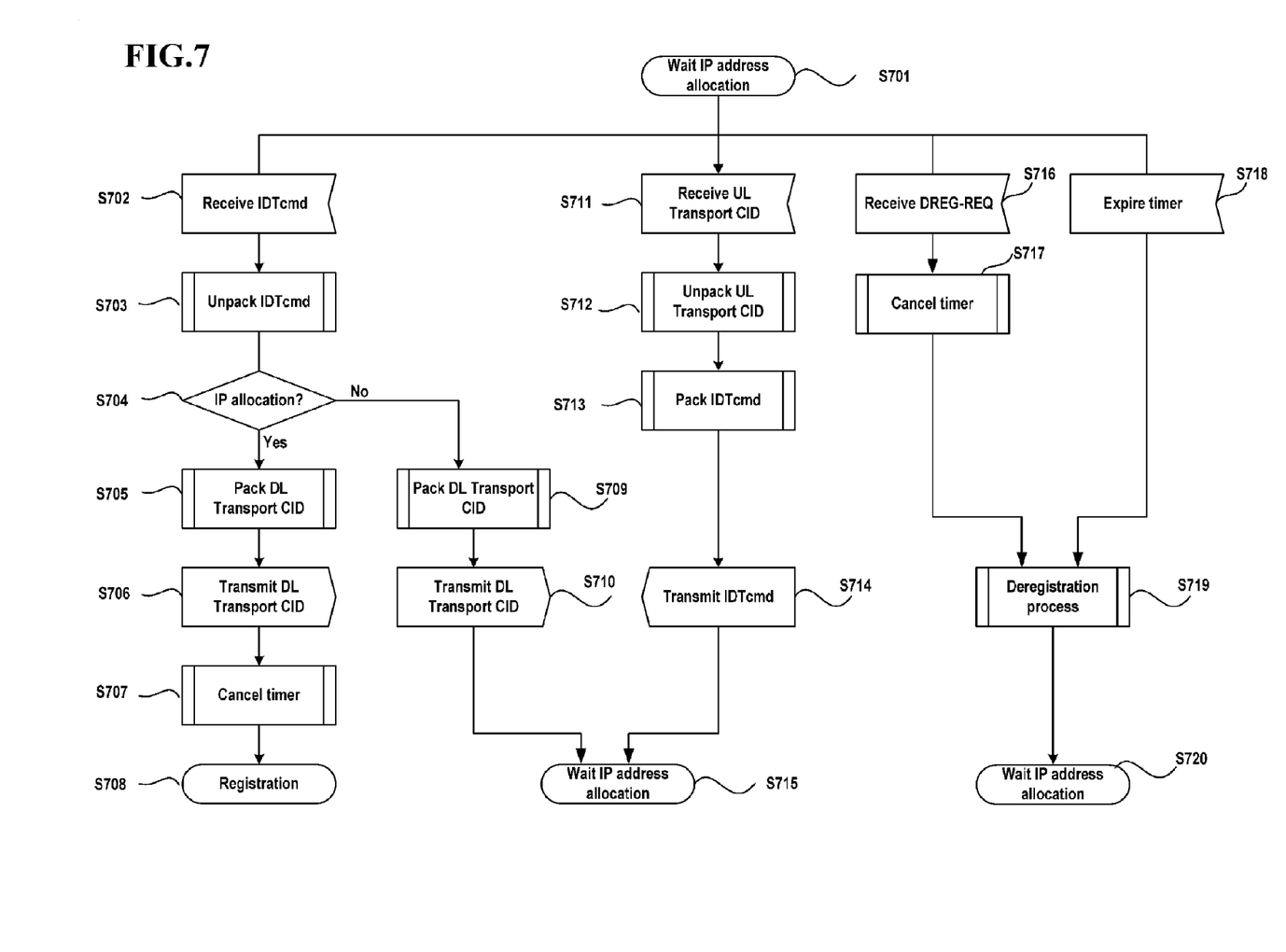
FIG. 7 is a flowchart representing an IP address allocation process according to the exemplary embodiment of the present invention.

An IP address allocation process in the IP management connection controlling method according to the exemplary embodiment of the present invention will now be described with reference to FIG. 7. FIG. 7 is a flowchart representing an IP address allocation process according to the exemplary embodiment of the present invention.

As shown in FIG. 7, when the access point 200 in the IP address allocation waiting mode in step S701 receives the IDTcmd message from the PAR 300 in step S702, the access point 200 unpacks the IDTcmd message in step S703, and identifies IP allocation from information included in a payload of the IDTcmd message in step S704.

When the access point 200 does not identify the IP address allocation from the payload, the access point 200 forms a traffic data packet by the DL Transport CID message in step S709, transmits the traffic data packet to the access terminal 100 in step S710, and maintains the IP address allocation waiting mode in step S715.

When the access point 200 identifies the IP address allocation from the payload, the access point 200 forms the traffic data packet by the DL Transport CID message in step S705, transmit the traffic data packet to the access terminal 100 in step S706, cancels the operating response timer in step S707, and changes the mode to a registration mode for receiving traffic connection establishment of the access terminal in which IP connection is completed in step S708.

When the access point 200 in the IP address allocation waiting mode in step S701 receives the traffic data packet through the UL Transport CID message from the access terminal 100 in step S711, the access point 200 unpacks the UL Transport CID message in step S712, forms the IDTcmd message having the payload that is the traffic data packet transmitted as the UL Transport CID message in step S713, transmits the formed IDTcmd message to the PAR 300 in step S714, and maintains the current IP address allocation waiting mode in step S715.

When the access point 200 in the IP address allocation waiting mode in step S701 receives the DREG-REQ message for requesting connection cancellation from the access terminal 100 in step S716, the access point 200 cancels the operating response timer in step S717, and performs the deregistration process in steps S719 and S720.

When the access point 200 in the IP address allocation waiting mode in step S701 receives a finish request of a timer operated to allocate the IP address of the access terminal in step S718, the access point 200 performs the deregistration process in steps S719 and S720.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An Internet Protocol (IP) management connection controlling method in an access point of a mobile communication system, the IP management connection controlling method comprising:

establishing a first traffic connection to a packet access router;

establishing uplink second traffic connection and downlink second traffic connection to an access terminal; and communicating an IP management message through the first traffic connection and at least one of the uplink second traffic connection and the downlink second traffic connection, wherein the establishing of the first traffic connection comprises:

receiving a first registration response message from the packet access router;

checking a registration result for the access terminal from the first registration response message, and transmitting a second registration response message to the access terminal when the registration result is a success;

allocating a traffic parameter for uplink and downlink IP management connections to the access terminal;

establishing an uplink transport connection identifier and an downlink transport connection identifier for traffic transmission; and transmitting a first dynamic service addition request message including the traffic parameter, the uplink transport connection identifier, and the downlink transport connection identifier to the packet access router.

2. The IP management connection controlling method of claim 1, wherein the communicating of the IP management message comprises:

receiving an IP direct transfer command message and unpacking the IP direct transfer command message;

identifying IP address allocation through information included in a payload of the IP direct transfer command message;

when identifying the IP address allocation, forming a traffic data packet as a downlink transport connection identifier message, and transmitting the downlink transport connection identifier message to the access terminal;

canceling a response timer; and changing a mode to a registration mode for receiving traffic connection establishment of the access terminal in which a IP connection is completed.

3. The IP management connection controlling method of claim 1, wherein the communicating of the IP management message comprises:

receiving an IP direct transfer command message and unpacking the IP direct transfer command message;

identifying IP address allocation through information included in a payload of the IP direct transfer command message; and when identifying no IP address allocation, forming a traffic data packet as a downlink transport connection identifier message, transmitting the downlink transport connection identifier message to the access terminal, and maintaining an IP allocation waiting mode.

4. The IP management connection controlling method of claim 1, wherein the communicating of the IP management message comprises:

receiving a traffic data packet through an uplink transport connection identifier message;

unpacking the uplink transport connection identifier message; and forming an IP direct transfer command message having the traffic data packet as a payload, and transmitting the IP direct transfer command message to the packet access router.

5. The IP management connection controlling method of claim 1, wherein the establishing of the first traffic connection further comprises:

receiving a first dynamic service addition response message from the packet access router;

checking the first dynamic service addition response message to identify connection to the packet access router;

when the connection to the packet access router is successfully performed, allocating uplink and downlink service flow identifiers; and transmitting a second dynamic service addition request message including the uplink and downlink service flow identifiers, the uplink transport connection identifier, the downlink transport connection identifier, and the traffic parameter.

6. The IP management connection controlling method of claim 1, wherein the establishing of the first traffic connection further comprises:

identifying a registration result for the access terminal from the first registration response message, and when the registration result is a failure, transmitting a third registration response message indicating a failure of the registration to the access terminal and deregistering the access terminal.

7. An Internet Protocol (IP) management connection controlling method in an access point of a mobile communication system, the IP management connection controlling method comprising:

establishing a first traffic connection to a packet access router;

establishing uplink second traffic connection and downlink second traffic connection to an access terminal; and communicating an IP management message through the first traffic connection and at least one of the uplink second traffic connection and the downlink second traffic connection, wherein the establishing of the first traffic connection comprises:

receiving a first registration response message from the packet access router;

identifying a registration result for the access terminal from the first registration response message;

transmitting a second registration response message indicating a failure of the registration to the access terminal; and deregistering the access terminal.

8. The IP management connection controlling method of claim 1, wherein the establishing of the uplink second traffic connection and the downlink second traffic connection comprises:

receiving a dynamic service addition response message from the access terminal;

checking the dynamic service addition response message to identify connection to the access terminal;

when the connection to the access terminal is successfully performed, transmitting a first dynamic service addition acknowledgement message including an identification code informing of success of the connection to the access terminal, and transmitting a second dynamic service addition acknowledgement message including the success of the connection to the packet access router; and changing a mode to an IP address allocation waiting mode.

9. The IP management connection controlling method of claim 1, wherein the establishing of the uplink second traffic connection and the downlink second traffic connection comprises:

receiving a dynamic service addition response message from the access terminal;

checking the dynamic service addition response message to identify connection to the access terminal;

when the connection to the access terminal has failed, transmitting a dynamic service addition acknowledgement message including an identification code informing of a failure of the connection to the access terminal; and deregistering the access terminal.

10. An Internet protocol (IP) management connection control method of an access point of a mobile communication system, the IP management connection controlling method comprising:

establishing initial ranging of an access terminal;

establishing basic transport capability of the access terminal;

authenticating the access terminal and exchanging an authentication key;

registering the access terminal;

establishing traffic connection to a packet access router;

establishing an uplink traffic connection and a downlink traffic connection to the access terminal; and communicating an IP management message through at least one of the uplink traffic connection and the downlink traffic connection, and allocating an IP address, wherein the establishing of the traffic connection to the packet access router comprises:

receiving a first registration response message from the packet access router;

checking a registration result for the access terminal from the first registration response message, and transmitting a second registration response message to the access terminal when the registration result is a success;

allocating a traffic parameter for uplink and downlink IP management connections to the access terminal;

establishing an uplink transport connection identifier and an downlink transport connection identifier for traffic transmission; and transmitting a first dynamic service addition request message including the traffic parameter, the uplink transport connection identifier, and the downlink transport connection identifier to the packet access router.

11. The IP management connection controlling method of claim 10, wherein, in the allocating of the IP address, the IP management message transmitted from the access terminal to the access point is transmitted as an uplink transport connection identifier message, and the IP management message transmitted from the access point to the access terminal is transmitted as a downlink transport connection identifier message.

12. The IP management connection controlling method of claim 10, wherein the communicating of the IP management message and allocating of the IP address comprises:
- receiving an IP direct transfer command message and unpacking the IP direct transfer command message;
- identifying IP address allocation through information included in a payload of the IP direct transfer command message;
- when identifying the IP address allocation, forming a traffic data packet as a downlink transport connection identifier message, and transmitting the downlink transport connection identifier message to the access terminal;
- canceling a response timer; and
- changing a mode to a registration mode for receiving traffic connection establishment of the access terminal in which a IP connection is completed.

13. The IP management connection controlling method of claim 10, wherein the communicating of the IP management message and allocating of the IP address comprises:
- receiving an IP direct transfer command message and unpacking the IP direct transfer command message;
- identifying IP address allocation through information included in a payload of the IP direct transfer command message; and
- when identifying no IP address allocation, forming a traffic data packet as a downlink transport connection identifier message, transmitting the downlink transport connection identifier message to the access terminal, and maintaining an IP allocation waiting mode.

14. The IP management connection controlling method of claim 10, wherein the communicating of the IP management message and allocating of the IP address comprises:
- receiving a traffic data packet through an uplink transport connection identifier message;
- unpacking the uplink transport connection identifier message; and
- forming an IP direct transfer command message having the traffic data packet as a payload, and transmitting the IP direct transfer command message to the packet access router.

15. The IP management connection controlling method of claim 10, wherein the establishing of the traffic connection to the packet access router further comprises:
- receiving a first dynamic service addition response message from the packet access router;
- checking the first dynamic service addition response message to identify connection to the packet access router;
- when the connection to the packet access router is successfully performed, allocating uplink and downlink service flow identifiers; and
- transmitting a second dynamic service addition request message including the uplink and downlink service flow identifiers, the uplink transport connection identifier, the downlink transport connection identifier, and the traffic parameter.

16. The IP management connection controlling method of claim 10, wherein the establishing of the traffic connection to the packet access router further comprises:
- receiving a first dynamic service addition response message from the packet access route;
- checking the first dynamic service addition response message to identify connection to the packet access router;
- when the connection to the packet access router has failed, transmitting a dynamic service addition acknowledgement message indicating a failure of the connection to the packet access router to the packet access router; and
- deregistering the access terminal.

17. The IP management connection controlling method of claim 10, wherein the establishing of the traffic connection to the packet access router further comprises:
- receiving a first registration response message from the packet access router;
- identifying a registration result for the access terminal from the first registration response message;
- transmitting a second registration response message indicating a failure of the registration to the access terminal; and
- deregistering the access terminal.

18. The IP management connection controlling method of claim 10, wherein the establishing of the uplink traffic connection and a downlink traffic connection to the access terminal comprises:
- receiving a dynamic service addition response message from the access terminal;
- checking the dynamic service addition response message to identify connection to the access terminal;
- when the connection to the access terminal is successfully performed, transmitting a first dynamic service addition acknowledgement message including an identification code informing of success of the connection to the access terminal, and transmitting a second dynamic service addition acknowledgement message including the success of the connection to the packet access router; and
- changing a mode to an IP address allocation waiting mode.

19. The IP management connection controlling method of claim 10, wherein the establishing of the uplink traffic connection and a downlink traffic connection to the access terminal comprises:
- receiving a dynamic service addition response message from the access terminal;
- checking the dynamic service addition response message to identify connection to the access terminal;
- when the connection to the access terminal has failed, transmitting a dynamic service addition acknowledgement message including an identification code informing of a failure of the connection to the access terminal; and
- deregistering the access terminal.

20. The IP management connection controlling method of claim 1, wherein the establishing of the first traffic connection comprises:
- receiving a first registration response message from the packet access router;
- identifying a registration result for the access terminal from the first registration response message;
- transmitting a second registration response message indicating a failure of the registration to the access terminal; and
- deregistering the access terminal.

* * * * *